US012671280B2

(12) United States Patent
Moore et al.

(10) Patent No.: US 12,671,280 B2
(45) Date of Patent: Jun. 30, 2026

(54) STATOR ASSEMBLY COOLING METHOD

(71) Applicant: Hamilton Sundstrand Corporation, Charlotte, NC (US)

(72) Inventors: Kellen Moore, Madison, WI (US); Joseph K. Coldwate, Roscoe, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 231 days.

(21) Appl. No.: 18/387,569

(22) Filed: Nov. 7, 2023

(65) Prior Publication Data

US 2025/0149935 A1 May 8, 2025

(51) Int. Cl.
| | |
|---|---|
| *H02K 1/20* | (2006.01) |
| *H02K 1/278* | (2022.01) |
| *H02K 21/14* | (2006.01) |

(52) U.S. Cl.
CPC .............. *H02K 1/20* (2013.01); *H02K 1/278* (2013.01); *H02K 21/14* (2013.01)

(58) Field of Classification Search
CPC ........... H02K 1/20; H02K 1/278; H02K 21/14
See application file for complete search history.

(56) References Cited

U.S. PATENT DOCUMENTS

| | | | | |
|---|---|---|---|---|
| 5,866,959 | A | * | 2/1999 | Le Flem .................. H02K 1/32 310/216.071 |
| 6,762,520 | B1 | | 7/2004 | Ehrhart et al. |

| | | | | |
|---|---|---|---|---|
| 11,411,448 | B2 | | 8/2022 | Coldwate et al. |
| 12,244,177 | B2 | * | 3/2025 | Keum ....................... H02K 1/20 |
| 2015/0076969 | A1 | * | 3/2015 | Lasorso ................... H02K 1/20 310/60 A |
| 2017/0179781 | A1 | | 6/2017 | Fan et al. |
| 2018/0174098 | A1 | * | 6/2018 | Andres ................. H02K 5/203 |
| 2019/0288584 | A1 | * | 9/2019 | Vansompel ............ H02K 9/227 |
| 2021/0066978 | A1 | * | 3/2021 | Coldwate ................. H02K 1/16 |
| 2022/0376566 | A1 | * | 11/2022 | Pal ........................... H02K 1/20 |

FOREIGN PATENT DOCUMENTS

| | | |
|---|---|---|
| DE | 102016222331 A1 | 5/2018 |
| EP | 3859942 A1 | 8/2021 |
| KR | 20170018008 A | 2/2017 |

OTHER PUBLICATIONS

Search Report issued in European Patent Application No. 24211246.4; Date of Mailing Mar. 17, 2025 (9 pages).

* cited by examiner

*Primary Examiner* — Thomas Truong
(74) *Attorney, Agent, or Firm* — CANTOR COLBURN LLP

(57) ABSTRACT

A stator core is provided and includes laminations disposed in a laminated arrangement to form a stator core body having an axial length extending in a lamination dimension. The stator core body includes an annular portion extending along the axial length, teeth extending radially from the annular portion and along the axial length and fins. Each tooth is formed to define one or more holes running along the axial length. The fins extend circumferentially across each of the one or more holes.

20 Claims, 8 Drawing Sheets

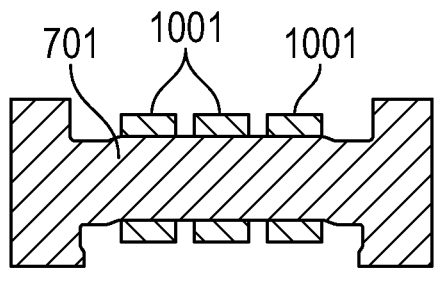
FIG. 10
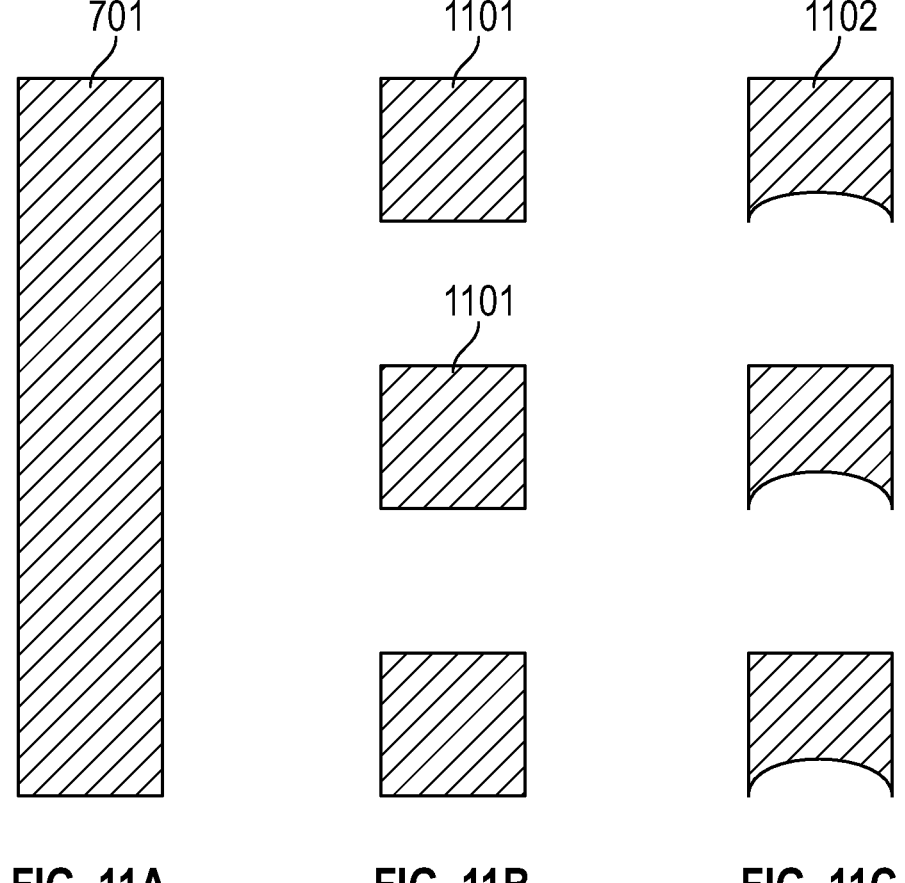
FIG. 11A          FIG. 11B          FIG. 11C

STATOR ASSEMBLY COOLING METHOD

BACKGROUND

The following description relates to stator assemblies and, more specifically, to a stator assembly with a cooling arrangement.

In a motor, a rotor can be rotatable disposed within a bore defined through a stator or about an exterior of the stator. In the former case, the rotor can be a shaft with a circular outer diameter that is equipped with a series of magnetic materials. The stator has a hub and a series of teeth extending radially inwardly from the hub toward the rotor. Windings made of conductive material are wound around each of the teeth. An air gap is provided between the rotor and the stator. When current is applied to the windings, a resultant magnetic flux interacts with the magnetic materials of the rotor to drive rotations of the rotor about its longitudinal axis. In the case where the rotor is disposed about an exterior of the stator, the teeth of the stator extend radially outwardly but the operation of the motor is generally similar.

Since the motor described above relies on current being applied to the windings, it is often necessary for the motor to be cooled. In many cases, this cooling is partially achieved by the motor being configured as an air-cooled motor but it is often the case that air-cooled motors are not adequately cooled. When this happens, the air-cooled motors suffer from reduced reliability due to insulation breakdown from routine exposure to excessive temperatures.

Therefore, a need exists for a stator assembly with a new cooling arrangement.

BRIEF DESCRIPTION

According to an aspect of the disclosure, a stator core is provided and includes laminations disposed in a laminated arrangement to form a stator core body having an axial length extending in a lamination dimension. The stator core body includes an annular portion extending along the axial length, teeth extending radially from the annular portion and along the axial length and fins. Each tooth is formed to define one or more holes running along the axial length. The fins extend circumferentially across each of the one or more holes.

In accordance with additional or alternative embodiments, each fin extends across an entirety of the corresponding hole.

In accordance with additional or alternative embodiments, each fin is split at a mid-point thereof.

In accordance with additional or alternative embodiments, each fin is offset from an opposite fin.

In accordance with additional or alternative embodiments, one or more turbulators are disposed on one or more fin.

In accordance with additional or alternative embodiments, each fin extends continuously along the axial length.

In accordance with additional or alternative embodiments, each fin is segmented along the axial length.

In accordance with additional or alternative embodiments, each fin has a concave surface facing incoming coolant flow.

According to an aspect of the disclosure, a stator core is provided and includes laminations disposed in a laminated arrangement to form a stator core body having an axial length extending in a lamination dimension. The stator core body includes an annular ring portion extending along the axial length, teeth extending radially inwardly from the annular ring portion and along the axial length and fins. Each tooth is formed to define one or more holes running along the axial length. The fins extend circumferentially across each of the one or more holes.

In accordance with additional or alternative embodiments, each fin extends across an entirety of the corresponding hole.

In accordance with additional or alternative embodiments, each fin is split at a mid-point thereof.

In accordance with additional or alternative embodiments, each fin is offset from an opposite fin.

In accordance with additional or alternative embodiments, one or more turbulators are disposed on one or more fin.

In accordance with additional or alternative embodiments, each fin extends continuously along the axial length.

In accordance with additional or alternative embodiments, each fin is segmented along the axial length.

In accordance with additional or alternative embodiments, each fin has a concave surface facing incoming coolant flow.

According to an aspect of the disclosure, a motor is provided and includes laminations disposed in a laminated arrangement to form a stator core body having an axial length extending in a lamination dimension. The stator core body includes an annular ring portion extending along the axial length teeth extending radially inwardly from the annular ring portion and along the axial length and fins. Each tooth is formed to define one or more holes running along the axial length. The fins extend circumferentially across each of the one or more holes. The motor further includes windings wound around the teeth and a rotor, which is drivable to rotate about a longitudinal axis thereof by current being applied to the windings.

In accordance with additional or alternative embodiments, the laminations include iron.

In accordance with additional or alternative embodiments, the one or more holes are receptive of a cooling air flow whereby the cooling air flow thermally interacts with the fins.

In accordance with additional or alternative embodiments, one of the annular portion is an annular ring portion, the teeth extend radially inwardly from an inner diameter of the annular ring portion and the rotor is rotatable within the stator core body and the annular portion is an annular cylinder portion, the teeth extend radially outwardly from an outer diameter of the annular cylinder portion and the rotor is rotatable about the stator core body.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

FIG. 10 is an enlarged view of a circumferential fin of FIG. 7 taken from within line 10-10 in accordance with embodiments; and FIGS. 11A, 11B and 11C are cross-sectional views of a circumferential fin of FIG. 7 taken along line 11-11 in accordance with embodiments.

These and other advantages and features will become more apparent from the following description taken in conjunction with the drawings.

DETAILED DESCRIPTION

Electromagnetic losses generated within the stator assembly of rotating machinery (generators, motors) contribute to heat and increasing temperatures. If temperatures within the assembly become too high, premature material failures can occur, particularly in the stator slot insulation between the stator copper winding and stator core. Existing methods to mitigate this problem include, but are not limited to, cooling fluid being flown across the outer diameter of the stator core, cooling fluid being flown through the gap between the stator and rotor, oil being sprayed onto stator copper winding end turns and stator slot insulation with high thermal conductivity. It has been found, however, that with increasing power densities of electric rotating machinery, current cooling technologies and methods are limited in their ability to adequately cool the hottest spots in these products.

Thus, as will be described below, a stator of electric rotating machinery is provided with integrated fluid cooling channels with fins manufactured into the stator core to maximize the surface area available for convective heat transfer. The fins of the integrated cooling channels can be circumferentially arranged or provided as offset pins.

Figure 1:
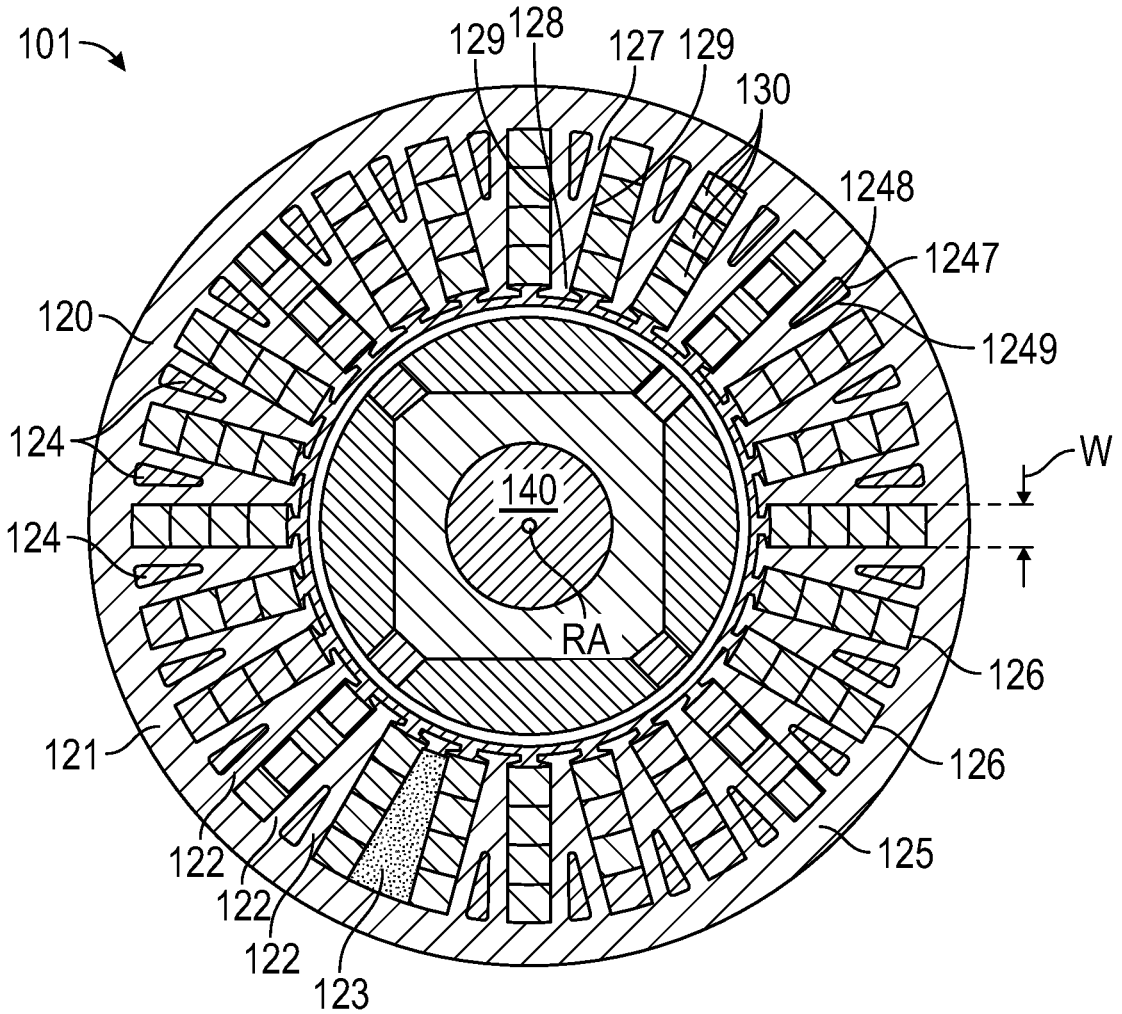
FIG. 1 is an axial view of a motor with an inner rotor and an outer stator core, where the outer stator core has trapezoidal teeth defining triangular cooling holes between neighboring windings in accordance with embodiments.
Figure 2:
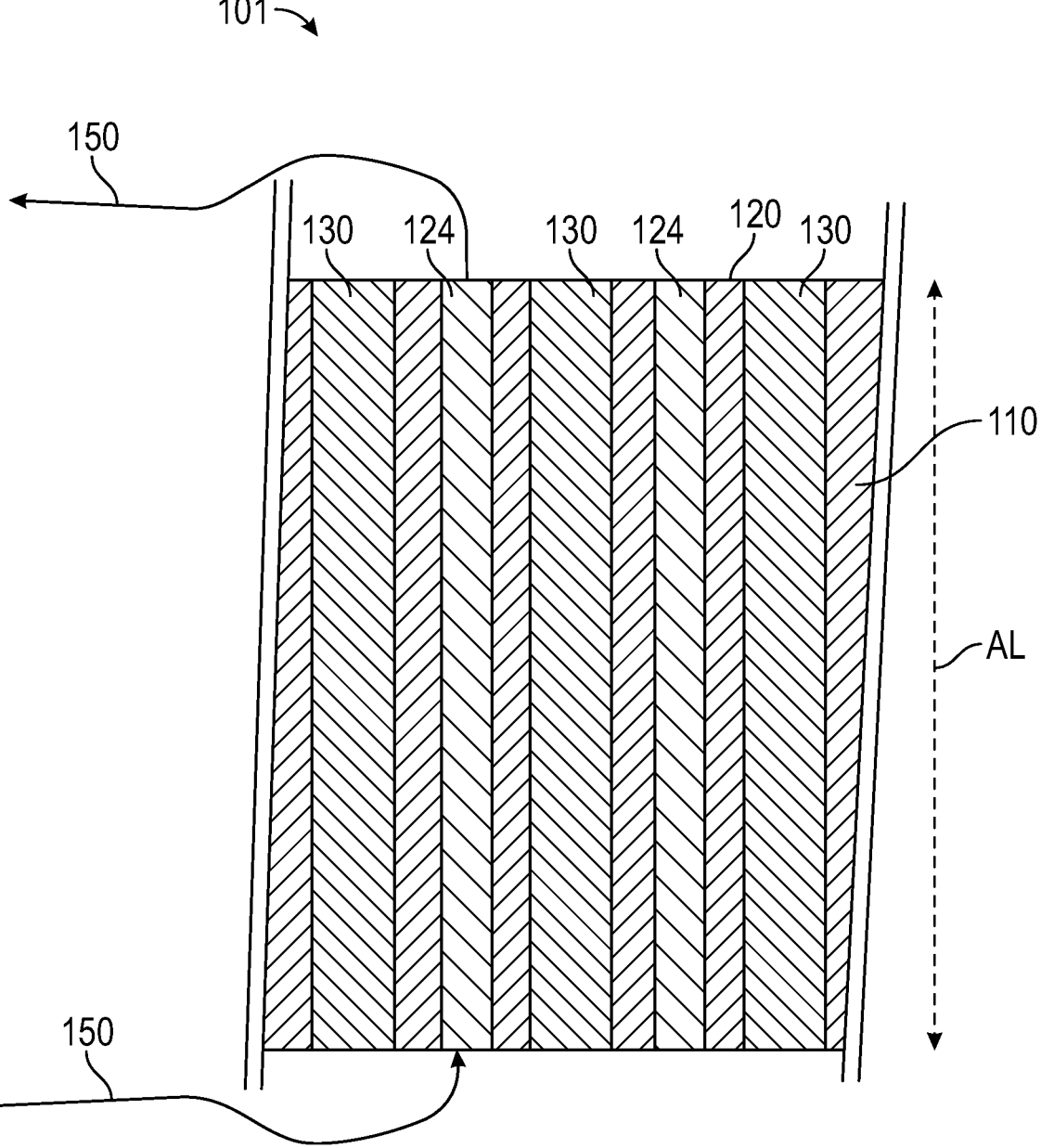
FIG. 2 is a side view of the motor of FIG. 1 in accordance with embodiments.

With reference to FIGS. 1 and 2, a motor 101 is provided and includes laminations 110 (see FIG. 2) that are disposed in a laminated arrangement to form a stator core body 120. The laminations 110 can include iron or other similar elements and alloys thereof. The motor 101 further includes windings 130 and a rotor 140. The stator core body 120 has an axial length AL (see FIG. 2) extending in a lamination dimension and includes an annular portion 121 and teeth 122. The annular portion 121 extends along the axial length AL. The teeth 122 extend radially from the annular portion 121 and along the axial length AL. Each tooth 122 has a trapezoidal shape 123 and is formed to define one or more triangular holes 124 running along the axial length AL.

During operations of the motor 101, the one or more triangular holes 124 can be receptive of a cooling airflow 150. Each of the one or more triangular holes 124 thus acts as a cooling duct located in a root of the corresponding tooth 122 and serves to remove self-generated heat from the windings 130 and the stator core body 120. A flux path down the tooth 122 is not affected by the presence of the one or more triangular holes 124.

The teeth 122 are all substantially a same shape and size. Similarly, the one or more triangular holes 124 are all substantially a same shape and size.

In accordance with embodiments and, as shown in FIG. 1 (and in FIGS. 3 and 4), the stator core body 120 can be formed about the rotor 140. In these or other cases, the annular portion 121 is an annular ring portion 125 and the teeth 122 extend radially inwardly from an inner diameter of the annular ring portion 125. The radially inward ends of the teeth 122 form a stator bore. The windings 130 are wound around the teeth 122 and are thus arranged in slots 126 between neighboring teeth 122. The windings 130 are configured to carry current applied thereto. The rotor 140 can be provided as a shaft having a rotational axis RA extending along a central longitudinal axis thereof and includes magnetic elements arrayed on an outer surface thereof. The rotor 140 is thus drivable to rotate within the stator bore of the stator core body 120 by magnetic flux generated by current being applied to the windings 130. As noted above, this magnetic flux extends axially through the teeth 122 and is not affected by the presence of the one or more triangular holes 124.

In accordance with embodiments, multiple windings 130 can be arranged along a radial dimension between neighboring teeth 122. The trapezoidal shape of the teeth 122 allow for the formation of the slots 126 to have substantially rectangular shapes and the windings 130 in each slot 126 between neighboring teeth 122 can have a substantially uniform width W along the radial dimension. In these or other cases, each tooth 122 has a first wide portion 127 at its root near or at the annular ring portion 125, a first narrow portion 128 remote from the root and sidewalls 129 extending between the first wide portion 127 and the first narrow portion 128. Here, each of the one or more triangular holes 124 defined by each tooth 122 has a second wide portion 1247 corresponding with the first wide portion 127, a second narrow portion 1248 corresponding with the first narrow portion 128 and sidewalls 1249 that are parallel with the sidewalls 129.

Figure 3:
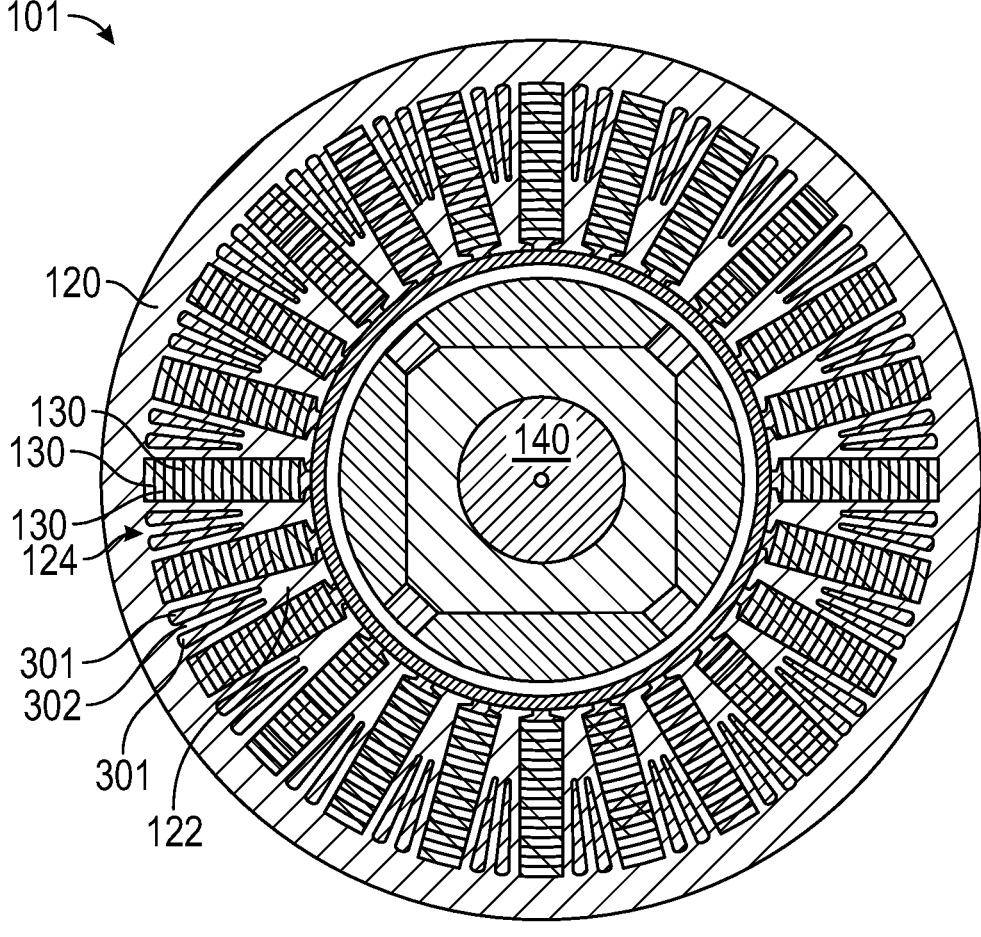
FIG. 3 is an axial view of a motor with an inner rotor and an outer stator core, where the outer stator core has trapezoidal teeth defining multiple triangular cooling holes between neighboring windings in accordance with embodiments.

With reference to FIG. 3 and, in accordance with embodiments, the one or more triangular holes 124 in each tooth 122 is a pair of triangular holes 301 bisected by a radially oriented member 302 of the stator core body 120. In this case, a surface area of the pair of triangular holes 301 and the radially oriented member 302 is maximized to provide for relatively high thermal communication in the stator core body 120. As above, a flux path extending axially along each tooth 122 is not affected by the presence of the pair of triangular holes 301 or the radially oriented member 302.

Figure 4:
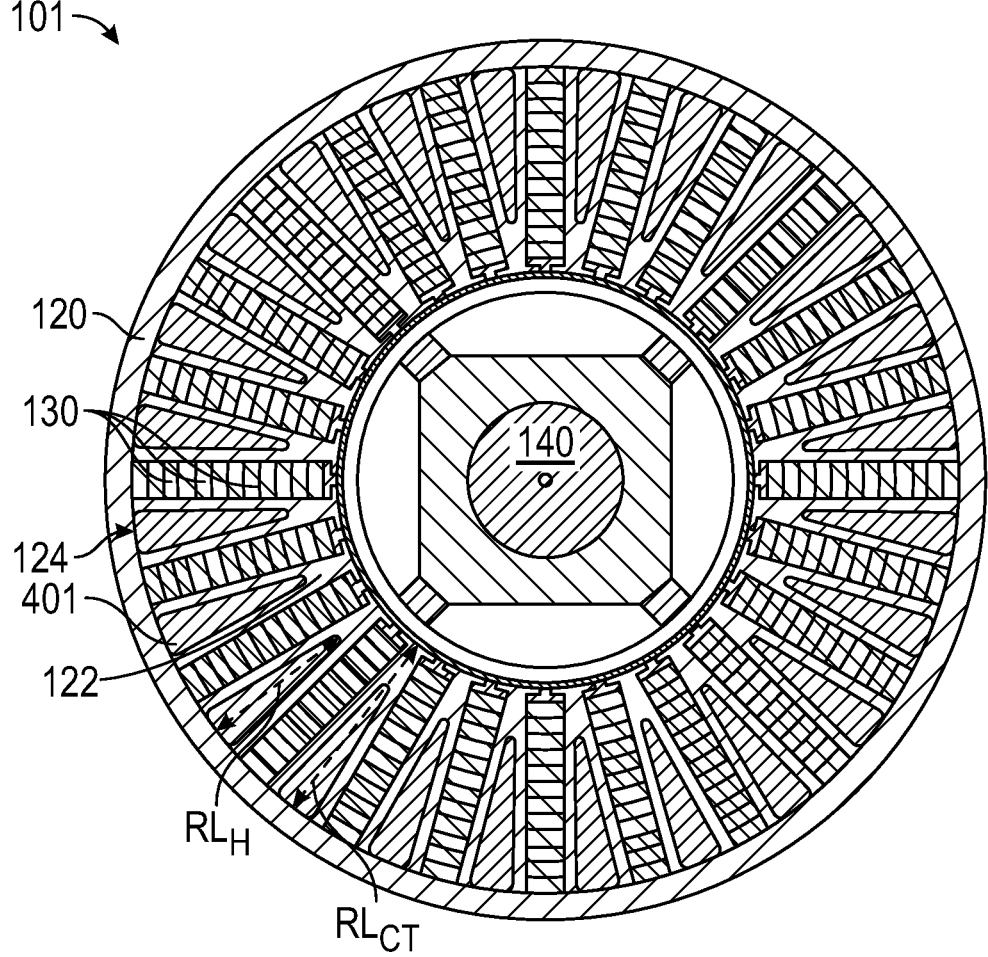
FIG. 4 is an axial view of a motor with an inner rotor and an outer stator core, where the outer stator core has trapezoidal teeth defining triangular cooling holes of relatively large dimensions between neighboring windings in accordance with embodiments.

With reference to FIG. 4 and in accordance with embodiments, the one or more triangular holes 120 in each tooth 122 is a single triangular hole 401. The single triangular hole 401 has a radial length $RL_H$ which exceeds half a radial length $RL_{CT}$ of the corresponding tooth 122. In this case, a triangular cooling duct area provided by each single triangular hole 401 is maximized to provide very low pressure drop across the stator core body 120. Again as above, a flux path extending axially along each tooth 122 is not affected by the presence of the single triangular hole 401.

Figure 5:
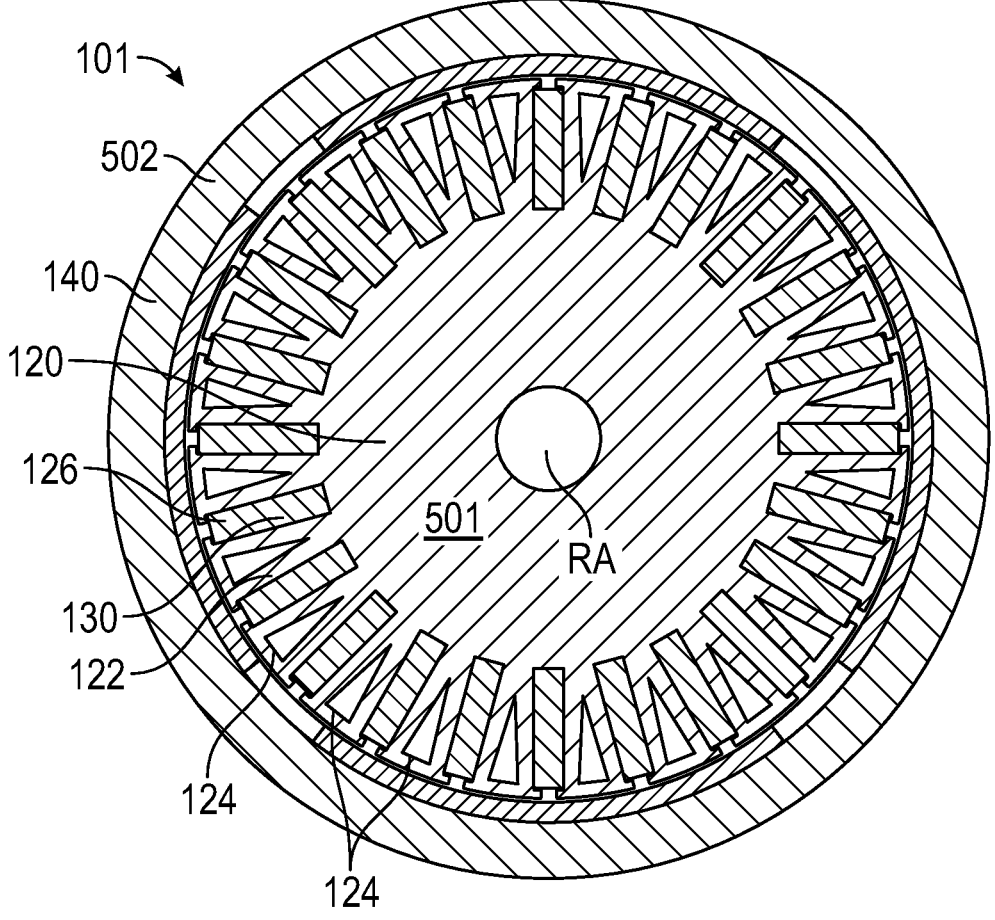
FIG. 5 is an axial view of a motor with an outer rotor and an inner stator core, where the inner stator core has trapezoidal teeth defining triangular cooling holes between neighboring windings in accordance with embodiments.

In accordance with alternative embodiments and, as shown in FIG. 5, the rotor 140 can be formed about the stator core body 120. In these or other cases, the annular portion 121 is an annular cylinder portion 501 and the teeth 122 extend radially outwardly from an outer diameter of the annular cylinder portion 501. As above, the windings 130 are wound around the teeth 122 and are thus arranged in slots 126 between neighboring teeth 122. The windings 130 are configured to carry current applied thereto. The rotor 140 can be provided as a cylinder 502 having a rotational axis RA extending along a central longitudinal axis of the stator core body 120 and includes magnetic elements arrayed on an interior surface thereof. The rotor 140 is thus drivable to rotate about the stator core body 120 by magnetic flux generated by current being applied to the windings 130. As noted above, this magnetic flux extends axially through the teeth 122 and is not affected by the presence of the one or more triangular holes 124.

Although the various embodiments of FIGS. 1 and 2, 3, 4 and 5 are described separately, it is to be understood that they are interchangeable. For example, the one or more triangular holes 124 of FIG. 5 can be provided as pairs of triangular holes as in FIG. 3 or as single triangular holes as in FIG. 4. In addition, it is to be understood that the various embodiments of FIGS. 1 and 2, 3, 4 and 5 can be used in combination with one another. For example, the pairs of triangular holes of FIG. 3 and the single triangular holes of FIG. 4 can be interspersed throughout the configurations of FIGS. 1 and 5.

Figure 6:
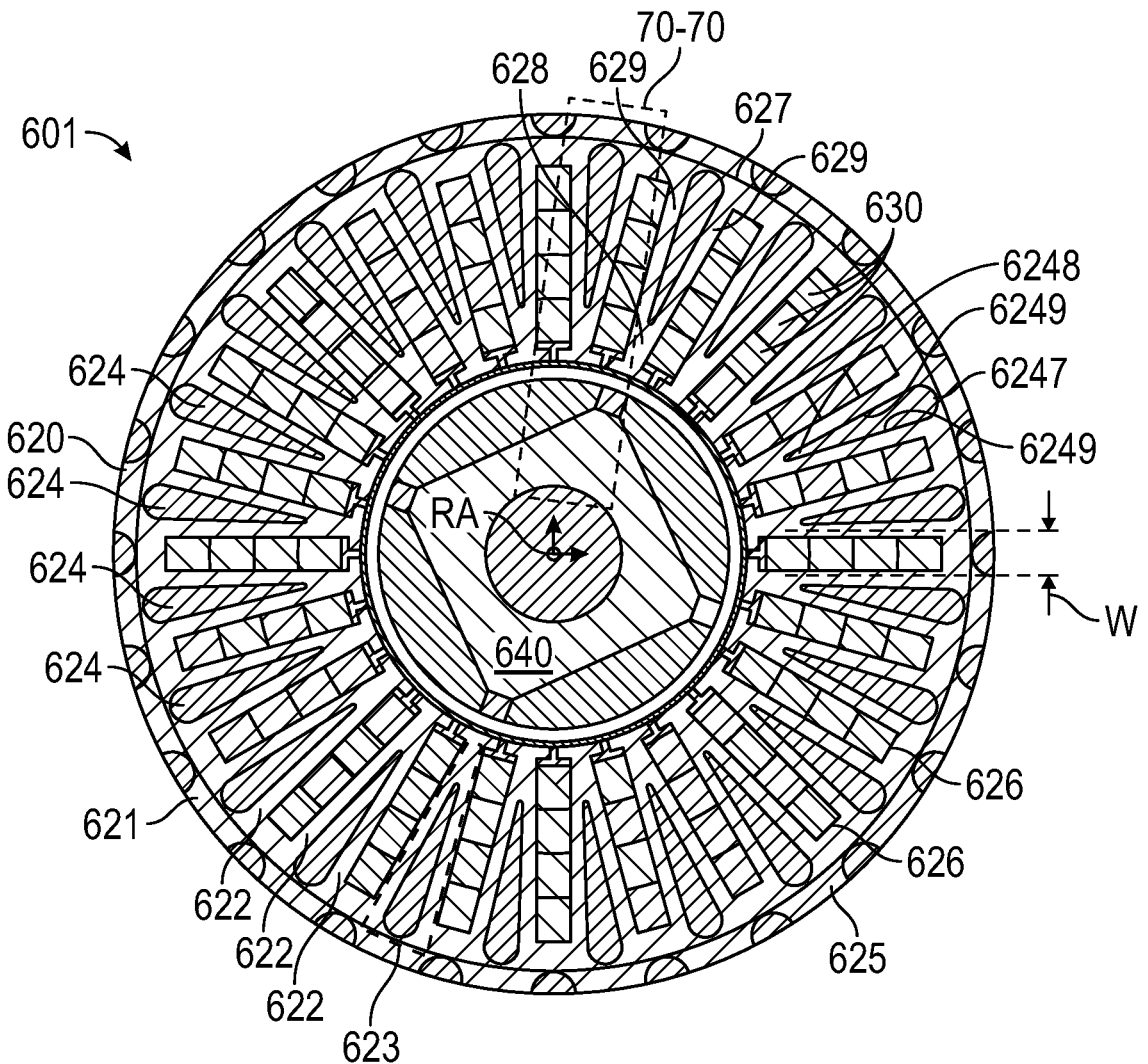
FIG. 6 is an axial view of a motor with an inner rotor and an outer stator core, where the outer stator core has teeth defining cooling holes with circumferential fins between neighboring windings in accordance with embodiments.
Figure 7:
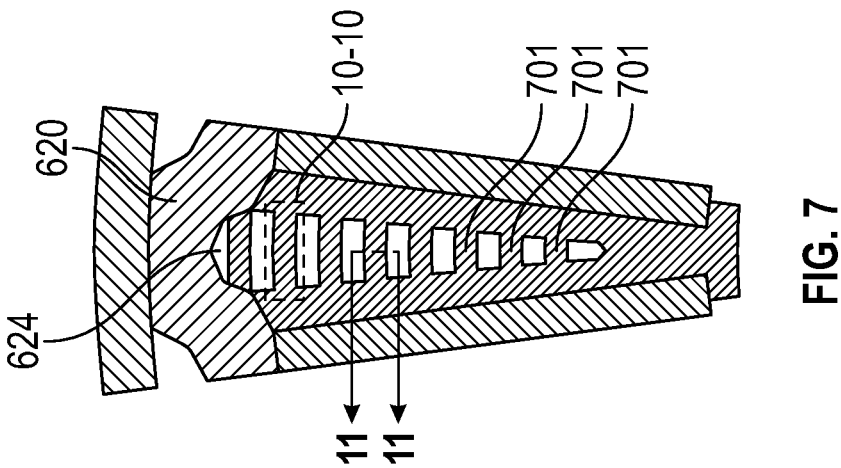
FIG. 7 is an enlarged view of a cooling hole and circumferential fins of FIG. 6 taken from within line 70-70 in accordance with embodiments.

With reference to FIGS. 6 and 7, embodiments similar to those described above with reference to FIGS. 1-4 and with reference to FIG. 5 can include circumferential fins as described below. For purposes of clarity and brevity, the following description will relate generally to the above-described embodiments of FIGS. 1 and 4. However, it is to be understood that this is not meant to otherwise limit the scope of the application or the claims in any way and that the following description is applicable to each above-described embodiment without undue experimentation by a person of ordinary skill in the art.

As shown in FIGS. 6 and 7, a motor 601 is provided and includes laminations (see laminations 110 in FIG. 2) that are disposed in a laminated arrangement to form a stator core body 620. The laminations can include iron or other similar elements and alloys thereof. The motor 601 further includes windings 630 and a rotor 640. The stator core body 620 has an axial length (see axial length AL in FIG. 2) extending in a lamination dimension and includes an annular portion 621 and teeth 622. The annular portion 621 extends along the axial length AL. The teeth 622 extend radially from the annular portion 621 and along the axial length AL. Each tooth 622 has a trapezoidal shape 623 and is formed to define one or more holes 624 running along the axial length AL.

During operations of the motor 601, the one or more holes 624 can be receptive of a cooling airflow (see cooling airflow 150 in FIG. 2). Each of the one or more holes 624 thus acts as a cooling duct located in a root of the corresponding tooth 622 and serves to remove self-generated heat from the windings 630 and the stator core body 620. A flux path down the tooth 622 is not affected by the presence of the one or more holes 624.

The stator core body 620 can be formed about the rotor 640. In these or other cases, the annular portion 621 is an annular ring portion 625 and the teeth 622 extend radially inwardly from an inner diameter of the annular ring portion 625. The radially inward ends of the teeth 622 form a stator bore. The windings 630 are wound around the teeth 622 and are thus arranged in slots 626 between neighboring teeth 622. The windings 630 are configured to carry current applied thereto. The rotor 640 can be provided as a shaft having a rotational axis RA extending along a central longitudinal axis thereof and includes magnetic elements arrayed on an outer surface thereof. The rotor 640 is thus drivable to rotate within the stator bore of the stator core body 620 by magnetic flux generated by current being applied to the windings 630. As noted above, this magnetic flux extends axially through the teeth 622 and is not affected by the presence of the one or more triangular holes 624.

In accordance with embodiments, multiple windings 630 can be arranged along a radial dimension between neighboring teeth 622. The trapezoidal shape of the teeth 622 allow for the formation of the slots 626 to have substantially rectangular shapes and the windings 630 in each slot 626 between neighboring teeth 622 can have a substantially uniform width W along the radial dimension. In these or other cases, each tooth 622 has a first wide portion 627 at its root near or at the annular ring portion 625, a first narrow portion 628 remote from the root and sidewalls 629 extending between the first wide portion 627 and the first narrow portion 628. Here, each of the one or more holes 624 defined by each tooth 622 has a second wide portion 6247 corresponding with the first wide portion 627, a second narrow portion 6248 corresponding with the first narrow portion 628 and sidewalls 6249 that are parallel with the sidewalls 629.

As further shown in FIG. 7, the stator core body 620 can further include fins 701. The fins 701 extend circumferentially across each of the one or more holes 624 to define sub-cooling ducts 702 that have more total surface area and thus more cooling effect than if the one or more holes 624 were empty. In accordance with embodiments, each fin 701 can extend across an entirety of a local span of the corresponding hole 624.

Figure 9:
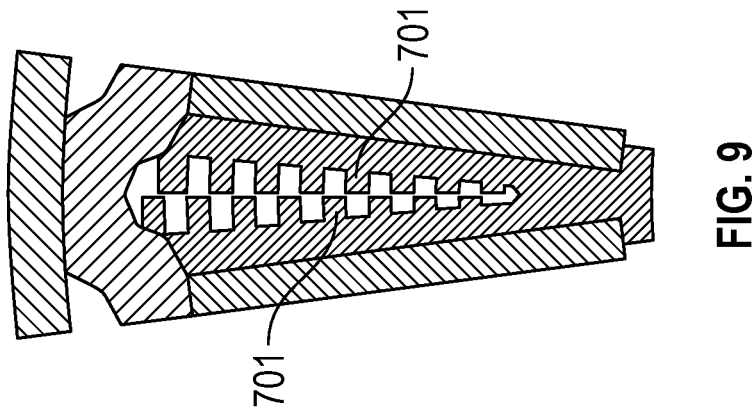
FIG. 9 is an enlarged view of split and offset circumferential fins of FIG. 7 in accordance with embodiments.
Figure 8:
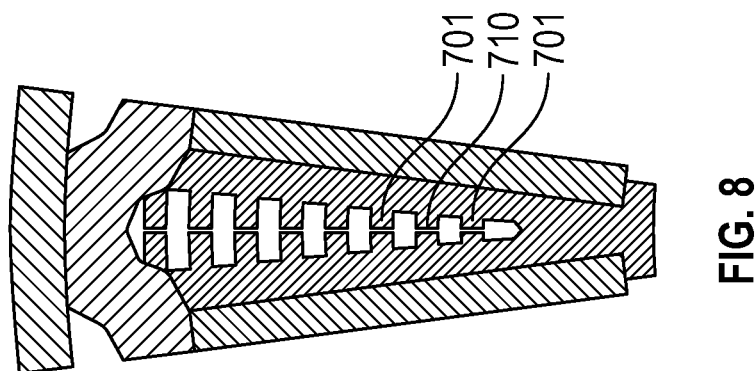
FIG. 8 is an enlarged view of split circumferential fins of FIG. 7 in accordance with embodiments.

With continued reference to FIG. 7 and with additional reference to FIGS. 8, 9 and 10, each fin 701 can be split at a mid-point thereof (see FIG. 8), each fin 701 can be offset from an opposite fin 701 (see FIG. 9) and/or each fin 701 can include one or more turbulators 1001 (see FIG. 10). In either of the cases of FIGS. 8 and 9, the distal ends of the fins 701 provide for additional surface area for cooling effects beyond the increased surface area of the fins 701 of FIG. 7 and minimize circulating currents being generated in the stator core. In the case of FIG. 10, the turbulators 1001 provide for additional surface area for cooling effects and also create turbulence in cooling flows that can also lead to greater cooling effects.

With continued reference to FIG. 7 and with additional reference to FIGS. 11A, 11B and 11C, each fin 701 can extend continuously along the axial length AL of the stator core body 620 (see FIG. 11A), each fin 701 can be segmented into fin sections 1101 along the axial length AL (see FIG. 11B) and, in the case of each fin 701 being segmented into the fin sections 1101, each fin section 1101 can have a concave surface 1102 facing incoming coolant flow to create vortices that can improve cooling effects.

Additive manufacturing and three-dimensional (3D) printing can be employed to form the fins 701 described herein, especially in cases where fin 701 size is relatively small and/or where detailed embodiments are small and may require unique formations.

Technical effects and benefits of the present disclosure are the provision of a stator core body of a rotating electric machine that has circumferential fins extending across holes defining cooling paths. These fins increase surface area for thermal interactions and thereby increase cooling effects beyond what is available with the holes alone. This increased cooling effect improves the operation of the stator core body. Also, the split nature of the fins minimizes circulating currents being generated in the stator core.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A stator core, comprising:
laminations disposed in a laminated arrangement to form a stator core body having an axial length extending in a lamination dimension, the stator core body comprising:
an annular portion extending along the axial length;
teeth extending radially from the annular portion and along the axial length, each tooth being formed to define one or more holes running along the axial length; and
fins extending circumferentially across each of the one or more holes,
wherein:
wherein each fin is segmented along the axial length into fin sections, and
each fin section of each fin has a concave surface facing in a direction of the axial length and facing incoming coolant flow.

2. The stator core according to claim 1, wherein each fin extends across an entirety of the corresponding hole.

3. The stator core according to claim 1, wherein each fin is split at a mid-point thereof.

4. The stator core according to claim 3, wherein each fin is offset from an opposite fin.

5. The stator core according to claim 1, further comprising one or more turbulators disposed on one or more fin.

6. The stator core according to claim 1, wherein each fin extends continuously along the axial length.

7. The stator core according to claim 1, wherein the fin sections of each segmented fin are aligned with one another along the direction of the axial length.

8. The stator core according to claim 7, wherein each fin section of each fin has a flat surface and the concave surface, the flat surface and the concave surface facing opposite one another in the direction of the axial length.

9. A stator core, comprising:
laminations disposed in a laminated arrangement to form a stator core body having an axial length extending in a lamination dimension, the stator core body comprising:
an annular ring portion extending along the axial length;
teeth extending radially inwardly from the annular ring portion and along the axial length, each tooth being formed to define one or more holes running along the axial length; and
fins extending circumferentially across each of the one or more holes, wherein:
the windings are wound around each tooth,
each one of the one or more holes extends radially along neighboring windings from an inboard radial terminus to an outboard radial terminus, which is radially outboard of a radially outermost one of the neighboring windings, and,
for each hole of the one or more holes, a radially outermost fin is disposed radially outboard of the radially outermost one of the neighboring windings and radially inboard of the outboard radial terminus.

10. The stator core according to claim 9, wherein each fin extends across an entirety of the corresponding hole.

11. The stator core according to claim 9, wherein each fin is split at a mid-point thereof.

12. The stator core according to claim 11, wherein each fin is offset from an opposite fin.

13. The stator core according to claim 9, further comprising one or more turbulators disposed on one or more fin.

14. The stator core according to claim 9, wherein each fin extends continuously along the axial length.

15. The stator core according to claim 9, wherein each fin is segmented along the axial length into fin sections aligned with one another along a direction of the axial length.

16. The stator core according to claim 15, wherein each fin section of each fin has a flat surface and a concave surface, the flat surface and the concave surface facing opposite one another in the direction of the axial length and the concave surface facing incoming coolant flow in the direction of the axial length.

17. A motor, comprising:
laminations disposed in a laminated arrangement to form a stator core body having an axial length extending in a lamination dimension, the stator core body comprising:
an annular ring portion extending along the axial length;
teeth extending radially inwardly from the annular ring portion and along the axial length, each tooth being formed to define one or more holes running along the axial length; and
fins extending circumferentially across each of the one or more holes,
the motor further comprising:
windings wound around the teeth; and
a rotor, which is drivable to rotate about a longitudinal axis thereof by current being applied to the windings,
wherein:
each one of the one or more holes extends radially along neighboring windings from an inboard radial terminus to an outboard radial terminus, which is radially outboard of a radially outermost one of the neighboring windings, and,
for each hole of the one or more holes, a radially outermost fin is disposed radially outboard of the radially outermost one of the neighboring windings and radially inboard of the outboard radial terminus.

18. The motor according to claim 17, wherein the laminations comprise iron.

19. The motor according to claim 17, wherein the one or more holes are receptive of a cooling air flow whereby the cooling air flow thermally interacts with the fins.

20. The motor according to claim 17, wherein one of:

the annular portion is an annular ring portion, the teeth extend radially inwardly from an inner diameter of the annular ring portion and the rotor is rotatable within the stator core body, and the annular portion is an annular cylinder portion, the teeth extend radially outwardly from an outer diameter of the annular cylinder portion and the rotor is rotatable about the stator core body.

* * * * *